Sept. 14, 1943.  L. P. LAMOREAUX  2,329,274
ORIENTATOR
Filed April 29, 1940
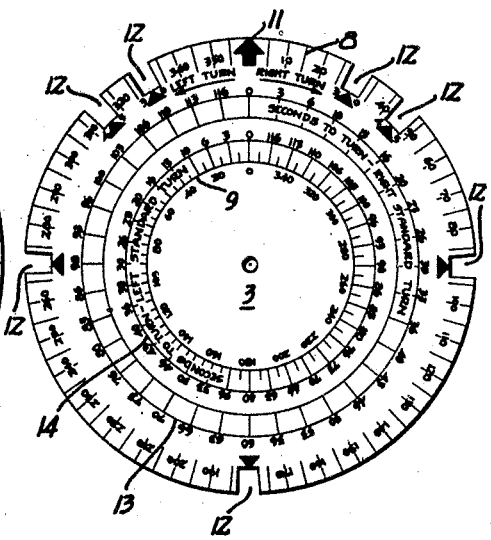
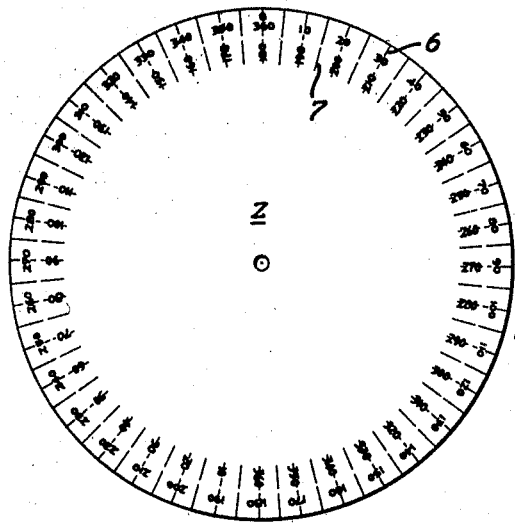
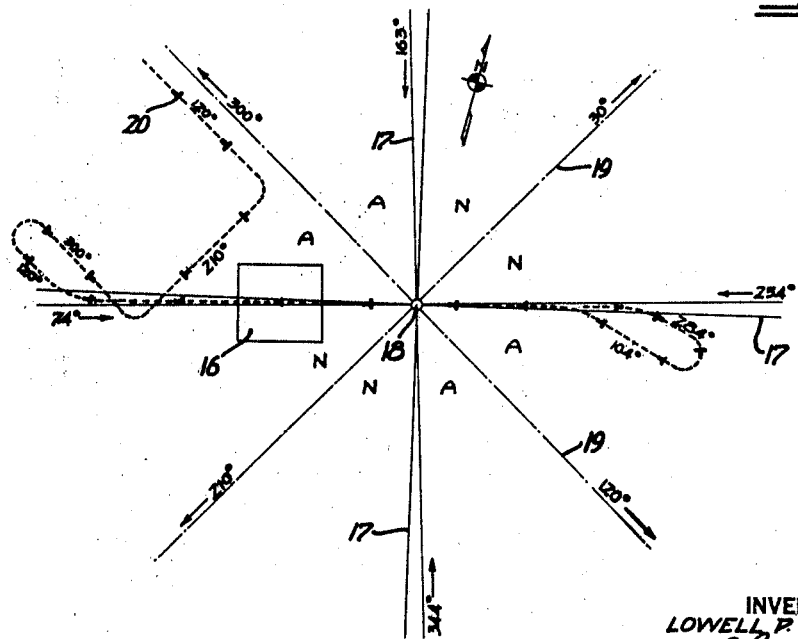
INVENTOR
LOWELL P. LAMOREAUX
BY
HIS ATTORNEY Patented Sept. 14, 1943

2,329,274

UNITED STATES PATENT OFFICE 2,329,274

ORIENTATOR

Lowell P. Lamoreaux, Santa Maria, Calif.

Application April 29, 1940, Serial No. 332,188

5 Claims. (Cl. 235—83)

My invention relates to a device for orienting craft of any kind, or for use in surveying or other work where rapid orientation is required. Primarily the device is designed to aid pilots of aircraft in making calculations relating to navigation.

It is among the objects of my invention to provide an orientator which functions as a mechanical aid in making calculations to eliminate mistakes occurring when such calculations are made by mental arithmetic.

Another object is to provide an orientation device which enables a pilot to quickly solve navigational problems and leave him freer to take care of other matters occupying his mental and physical attention.

Another object is to provide an orientator adapted to assist in making calculations for instrument flying, either with or without radio aid in navigation.

A further object is to provide an orientation device which is so designed and calibrated as to indicate a new heading for the aircraft and also the number of seconds required for a turn in order to achieve the new heading.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view of the upper disc of my orientator; and

Figure 2 is a similar view of the lower disc.

Figure 3 is a vertical sectional view of the assembled discs.

Figure 4 is a diagrammatic view illustrating the procedure involved in using my orientator under conditions of instrument flight with radio aid to navigation.

It is well known that blind flying an airplane by instrument is a task that occupies substantially all of the pilot's attention. So completely engrossed is he in the work at hand that little thought can be given to orientation; in fact, anything that has to do with changing the direction or heading of the plane relative to the compass is a severe tax on the pilot's power of concentration, and mistakes are often made with grave consequences.

For example, say a plane has a compass heading of 265 degrees and a turn of 270 degrees to the right is required. In order to calculate the new heading the pilot mentally adds these numbers together to get the sum of 535. This indicates that the turn goes through the north heading of 360 degrees, so the new heading is 535 minus 360 equals 175 degrees. Another way to arrive at the new heading would be to subtract 90 degrees from the original heading of 265 degrees. In either case mental arithmetic is involved which is difficult to do when the attention is absorbed by other things under conditions of instrument flight. When calculating the new heading in the example given the pilot must also remember the time required to make the desired turn, which time for a standard turn (one needle-width on the bank and turn instrument) of 270 degrees is 90 seconds. This looks fairly easy on paper, but the test comes under the stress of instrument flight, either real or simulated during instruction. Calculation of new headings is further complicated during instrument flight with radio aid because of particular procedure involved.

With my improved orientation device new headings and times required to make turns are readily and accurately ascertained and indicated without requiring mental arithmetic or dependence upon the memory of the pilot.

In terms of broad inclusion, my orientator comprises an angular degree scale and a pair of oppositely directed angular degree scales movable relative to the first scale. These scales are preferably arranged on a pair of pivotally connected elements or discs. A reciprocal or interchangeably readable angular degree scale, offset 180° from the readings of the first scale, is also preferably associated with the first scale, and a pair of oppositely directed time scales are preferably associated with the other degree scales. The angular degree scales preferably extend 360 degrees about the discs, and notches are preferably provided in one of the discs to expose portions of the reciprocal or 180° offset degree scale on the other disc. The time scales are coextensive with the associated degree scales and each spans a 120 second interval. When used as an orientator for craft, such as an airplane, the first angular degree scale indicates headings of the craft, and a scale movable relative thereto indicates the degrees of turn between headings, so that when the zero mark of the latter scale is registered with a predetermined initial heading on the first scale a new heading may be readily ascertained. The 180° offset degree scale indicates an opposite heading; and the time scales indicate the time required to make a predetermined turn, either to the right or left.

In greater detail, and referring to Figures 1 to 3 of the drawing, my orientator comprises a pair of relatively movable elements or discs 2 and 3 pivotally connected together at the centers by a pin 4. Lower disc 2 is preferably somewhat larger than the upper disc so that its peripheral portions project beyond the edge of the upper disc. These disc elements may be made of any suitable material, and may be of any convenient size.

A 360 angular degree scale 6 is provided on the projecting or exposed peripheral portions of the lower disc, and a second angular degree scale 7 is provided on the lower disc to underlie the peripheral portions of the upper disc. The zero mark on scale 6 registers with the 180 degree mark on associated scale 7 whereby each degree marking on scale 6 finds its counterpart in 180° offset relation on inner scale 7, for indicating an opposite heading. The 180° offset scale is normally not visible however because of its being covered by the overlying disc. Both of these scales are directed compasswise, that is, they increase clockwise as viewed in Figure 2. For simplicity I have shown marks only at the five degree intervals, it being understood that the scales may be marked down to single degrees or less.

A pair of 360 angular degree scales 8 and 9 are provided on upper disc 3. Scale 8 is arranged at the periphery and is directed compasswise, while scale 9 is spaced inwardly somewhat and is directed countercompasswise. The zero marks of both of these scales are aligned and register with a suitable pointer 11 on the periphery of the upper disc. Suitable notches 12 are also cut in the periphery of the upper disc, preferably at the 90, 180 and 270 degree marks of scale 8 and also preferably at the 30 and 45 degree marks of both scales 8 and 9. These notches expose portions of the underlying 180° offset scale 7, and also serve as indicators to bring the eye quickly to the degree markings on the upper disc scales at the points mentioned.

When used as an orientation device for airplanes the scale 6 of my device indicates the headings of the plane, and scale 7 indicates the opposite headings. Scales 8 and 9 indicate the degrees of turn, right and left, to be made by the plane; so that when the zero marks of scales 8 and 9 are registered with a predetermined initial heading, a new heading at a predetermined angular relation to the initial heading may be readily ascertained. Since 90, 180 and 270 degree turns are frequently made the notches 12 help to train the eye on these points and also give the opposites of these headings.

A pair of time scales 13 and 14 are also preferably arranged on the upper disc in the space between scales 8 and 9. These time scales are oppositely directed from zero marks aligned with those of the associated degree scales 8 and 9. Both of these scales are coextensive with the associated degree scales, that is, they extend 360 degrees about the circle, and each spans a 120 second time interval. The time scales are calibrated in terms of seconds required for an airplane to make a standard turn through a given angle; viz., three seconds for ten degrees, six seconds for twenty degrees, ten seconds for thirty degrees, etc. "Standard turn" in aeronautical terminology means the turn ascribed with deflection of one needlewidth on the bank and turn instrument. Scale 13 indicates the time in seconds for a right standard turn, and scale 14 indicates the time in seconds for a left standard turn; a full turn of 360 degrees being made in 120 seconds or two minutes.

An example of the use of my orientator during instrument flying only is as follows:

Assume that the plane has a compass heading of 265 degrees and that a turn of 270 degrees to the right is required. Pointer 11 is set at 265 degrees on scale 6 and the new heading of 175 degrees is read on scale 6 above the 270 degree notch of scale 8. The time of 90 seconds for such turn is also noted on scale 13 inwardly of the notch. Compare the ease of this procedure with the same problem hereinbefore discussed.

Had the turn been to the left, the inner scale 9 would have been used to indicate the degrees of turn, the new heading of course being read on scale 6 and the time on scale 14. Should the degrees of turn not fall at one of the notches the eye is merely carried up from the selected degree marking to scale 6, the only difference being that the notch is not present to make the degree marking stand out.

An example of the use of my orientator during instrument flying with radio aid is as follows:

Figure 4 shows diagrammatically a landing field 16 with directional beams 17 radiating outwardly from a radio station 18. In the example chosen the beams have headings toward the station of 74, 254, 163 and 344 degrees, one beam of which lies along the axis of the landing field. Bisectors 19 of the quadrants have headings away from the station of 300, 30, 120 and 210 degrees; it being the usual practice to give the beam headings toward and bisector headings away from the station. The signals in two opposite quadrants are code letter A (. —) and the signals in the other two quadrants are code letter N (— .). These signals merge into a continuous note along the beams. The ordinary system of orientation, called the 90 degree system, involves the following procedure which I will explain in conjunction with my orientation device to illustrate its convenience in this type of work.

Assume that the pilot wishes to make a landing along the beam having a heading toward the station of 74 degrees. The problem of course is to get onto the beam with the opposite or 254 degree heading. Let us say that the pilot turns on his radio and finds himself in one of the "A" quadrants. Knowing the bisector headings for the "A" quadrants, the pilot directs the plane with a heading of either 300 degrees or 120 degrees. Suppose that he is actually in the northwest "A" quadrant and has selected a heading of 120 degrees as shown in Figure 4, the course of the plane 20 being indicated by dotted lines. The pilot then sets arrow 11 of the orientator on 120 degrees of scale 6 and reads his new heading on scale 6 above a notch 12 either 90 degrees to the left or to the right of arrow 11, depending upon whether there is a choice in turn on account of contour of terrain or some other reason. If he decides upon a right turn the new heading of 210 degrees would be read from scale 6, and the time of 30 seconds for the turn would be observed on scale 13.

Having turned the plane to this new heading the pilot then sets arrow 11 to the heading of 210 degrees and reads the next heading of 300 degrees on scale 6 above the notch 90 degrees to the right of arrow 11, and again observes the time of 30 seconds on scale 13. After flying through the beam until he hears the "N" signal the pilot turns the plane right to the heading of 300 degrees, and reads the next heading of 120 degrees on the 180° offset scale 7 in the same notch which gave him the previous heading. The time of 60 seconds for a left turn of 180 degrees is read on scale 14. The plane is then turned left to the heading of 120 degrees and the pilot flies back and turns along the beam which he observes to have a heading of 74 degrees. He proceeds along the beam to the station, over which there is a cone of silence, and then continues out along the opposite beam for a period of six minutes, or such time, not over six minutes, that enables him to drop to an altitude of 1000 feet.

In the meantime the pilot sets arrow 11 of the orientator to the heading of 74 degrees and reads the next heading on scale 6 above either the 30 or 45 degree notch, either to the left or to the right of arrow 11. Here again the turn chosen depends upon the contour of terrain or other reason that would cause the pilot to make a particular choice. Let us say that the pilot chooses the heading of 104 degrees, which he reads on scale 6 above the right-hand 30 degree notch. The time of ten seconds for the 30 degree turn is read on scale 13. The reciprocal heading of 284 degrees is also observed in the same notch on scale 7; and the time of 60 seconds for the 180 degree turn is read on scale 14. The plane is first turned right to the heading of 104 degrees, then left to the heading of 284 degrees, and then back to the landing field along the beam with a heading of 254 degrees.

I claim:

1. An orientator for craft comprising a pair only of concentrically pivoted plates, a 360 angular degree scale concentrically arranged on one of the plates for indicating headings of the craft, a second 360 angular degree scale concentrically arranged on the other plate and having a zero pointer registerable with a predetermined initial heading on the first mentioned scale, said second scale indicating degrees of turn between headings and having calibrations registerable with those of the first scale to establish a new heading on the first scale at a predetermined angular relation to the initial heading, and a 180° offset degree scale concentrically arranged on the plate carrying the first mentioned scale and having calibrations aligned with those of the first scale to indicate an opposite heading.

2. An orientator for craft comprising a pair only of concentrically pivoted plates, a 360 angular degree scale concentrically arranged on one of the plates for indicating headings of the craft, a pointer to aid rapid recognition on the other plate at the zero marking and registerable with a predetermined initial heading on said scale, a second pointer on said other plate to establish a new heading on said scale at a predetermined angular relation to the initial heading, and a 180° offset degree scale concentrically arranged on the plate carrying the first mentioned scale and having calibrations aligned with those of the first scale to indicate an opposite heading.

3. An orientator for craft comprising a plate, a disc concentrically pivoted to the plate, a 360 angular degree scale concentrically arranged on the plate for indicating headings of the craft, a pointer on the disc registerable with a predetermined initial heading on said scale, a second pointer on the disc to establish a new heading on the first scale at a predetermined angular relation to the initial heading, and a 180° offset angular degree scale concentrically arranged on the plate and underlying the disc, said 180° offset scale having calibrations aligned with those of the first scale to indicate an opposite heading, said disc having an opening therein adjacent the second pointer to expose portions of the 180° offset degree scale.

4. An orientator for craft comprising a plate, a disc pivoted to the plate, a 360 angular degree scale concentrically arranged on the plate for indicating headings of the craft, a second 360 angular degree scale concentrically arranged on the disc and having a pointer at the zero mark registerable with a predetermined initial heading on the first scale, said second scale indicating degrees of turn between headings and having calibrations registerable with those of the first scale to establish a new heading on the first scale at a predetermined angular relation to the initial heading, and a 180° offset degree scale concentrically arranged on the plate and underlying the upper disc, said 180° offset scale having calibrations aligned with those of the first scale to indicate an opposite heading, said disc having an opening therein adjacent a predetermined degree marking on the second angular degree scale to expose portions of the 180° offset degree scale.

5. A device of the character described consisting of two concentric discs pivotally connected at their centers, the upper disc being of smaller diameter than the lower disc, said discs being provided with scales comprising a 360 angular degree scale arranged in the uncovered peripheral area of the lower disc, a second 360 angular degree scale concentrically arranged on the lower disc within the first scale and normally covered by the upper disc, said second scale progressing in the same direction as the first scale and 180° offset therefrom, a third 360 angular degree scale concentrically arranged on the peripheral portion of the upper disc to work with and progressing in the same direction as said first scale, a fourth 360 angular degree scale concentrically arranged on the upper disc within the third scale to work with and progressing in the opposite direction from the first scale, the origins of the third and fourth scales being on the same radial line, and a pointer to aid rapid working of the scales disposed at the zero marking of the third scale, the edge of the upper disc being notched at 30°, 45° and 90° on both sides of the pointer and at 180° therefrom to reveal values in the second scale.

LOWELL P. LAMOREAUX.